US008069249B2

(12) United States Patent
Davidsson

(10) Patent No.: US 8,069,249 B2
(45) Date of Patent: Nov. 29, 2011

(54) METHOD, CONTROL DEVICE AND NETWORK NODE FOR MAINTAINING A CONNECTION WHEN A REQUEST IS PENDING

(75) Inventor: Marcus Davidsson, Lund (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1253 days.

(21) Appl. No.: 10/595,165

(22) PCT Filed: Sep. 15, 2004

(86) PCT No.: PCT/EP2004/010277
§ 371 (c)(1),
(2), (4) Date: Feb. 12, 2007

(87) PCT Pub. No.: WO2005/029898
PCT Pub. Date: Mar. 31, 2005

(65) Prior Publication Data
US 2007/0214269 A1   Sep. 13, 2007

Related U.S. Application Data

(60) Provisional application No. 60/505,902, filed on Sep. 25, 2003.

(30) Foreign Application Priority Data

Sep. 19, 2003  (EP) .................................... 30779664

(51) Int. Cl.
*G05F 15/16* (2006.01)
(52) U.S. Cl. ........................................ 709/227; 709/250
(58) Field of Classification Search .................. 709/227, 709/250
See application file for complete search history.

(56) References Cited

U.S. PATENT DOCUMENTS 5,907,805 A * 5/1999 Chotai .................... 455/414.1
2003/0153309 A1 * 8/2003 Bjelland et al. ............... 455/432

FOREIGN PATENT DOCUMENTS

WO    WO 9533353 A    12/1995
WO    WO 0191382 A    11/2001
WO    WO 0191382 A1 * 11/2001

OTHER PUBLICATIONS

European Patent Office, International Search Report for PCT?EP2004/010277, dated Dec. 21, 2004.
3GPP. 3rd Generation Partnership Project: Technical Specification Group Core Network; Mobile Radio Interface Layer 3 Specification; Core Network Protocols: Stage 3 (Release 1999), 3GPP TS 24.008 v3.16.0 (Jun. 2003).

* cited by examiner

*Primary Examiner* — Wing Chan
*Assistant Examiner* — Andrew Woo
(74) *Attorney, Agent, or Firm* — Roger S. Burleigh

(57) ABSTRACT

A method and a device in a communication apparatus for maintaining an established connection between said apparatus and a network node. The connection is established by a mobility management unit for providing a mobility management procedure. An acceptance message is issued by the node in response to a request relating to a first mobility management procedure. If any request relating to a second mobility management procedure issued by an upper layer is received by the mobility management unit after the request relating to the first procedure is transmitted and before the acceptance message is received, a maintaining request to maintain the connection is transmitted to the node in response to the acceptance message.

10 Claims, 5 Drawing Sheets

METHOD, CONTROL DEVICE AND NETWORK NODE FOR MAINTAINING A CONNECTION WHEN A REQUEST IS PENDING

This application claims the benefit of U.S. Provisional Application No. 60/505,902, filed Sep. 25, 2003, the disclosure of which is fully incorporated herein by reference.

TECHNICAL FIELD OF THE INVENTION

The present invention relates to the field of communication, and more specifically to the field of establishing and maintaining a connection between a communication device and a network.

DESCRIPTION OF RELATED ART

In a communication system several protocols may be provided for obtaining and controlling communication between a communication device and a network. One such communication system is a mobile telecommunication system, such as a GSM (General System for Mobile communication), a GPRS (General Packet Radio Service), or a UMTS (Universal Mobile Telecommunications System) system. A communication device, such as a mobile radio terminal, a mobile telephone, a pager, a communicator, a smartphone, an electronic organizer, etc. communicates with a core network (CN) via a radio access network, such as the UTRAN (UMTS Terrestrial Radio Access Network) of the UMTS system or the BSS (Base Station Sub-system) of the GSM/GPRS system. The UTRAN comprises one or several nodes B (base stations), which are controlled by a radio network controller (RNC). Similarly, the BSS comprises one or several base transceiver stations (base stations) controlled by a base station controller (BSC).

To keep track of in which of several routing areas (RA) or location areas (LA) of the system a portable communication device is located, each portable communication device is assigned an identity, which the system has knowledge of (see below). The mobility management protocol is responsible for updating the location area when a transition from a first to a second area occurs.

The core network may comprise two service domains, the CS (circuit switched) domain and the PS (packet switched) domain. In the CS domain, the communication device may be identified by an international mobile subscriber identity (IMSI) or a temporary mobile subscriber identity (TMSI), which is a temporary identity within the LA/RA and which is non-mandatory in the CS domain. In the PS domain, the communication device may be identified by IMSI and packet temporary mobile subscriber identity (P-TMSI), which is assigned to the communication device by the Network. The CS domain of the core network may comprise three network nodes, the MSC/VLR (Mobile Switching Center/Visitor Location Register), the GMSC (Gateway Mobile Switching Center) and HLR (Home Location Register). Similarly, the PS domain of the core network may comprise three network nodes, the SGSN (Serving GPRS Support Node) a GGSN (Gateway GPRS Support Node) and a HLR.

Procedures such as attach, paging, and location update are defined separately for CS and PS. Location area (LA) update may be performed for CS, whereas routing area (RA) update may be performed for PS. Combined functions are also available.

A number of protocols are provided in the communication device and the communication network, which obtain and control the communication over different connections or channels. The mobility management (MM) protocol is responsible for mobility management in the CS domain, and the GPRS mobility management (GMM) protocol is responsible in the PS domain. The MM and GMM protocols facilitate mobility management communication that is logically provided between the core network and the communication device, and which is not interpreted by the UTRAN or the BSS. These procedures comprises e.g. location management for keeping track of the present location and/or routing area of the communication device, authentication, temporary identity management and equipment check.

The MM and GMM protocols obtain and manage signaling connections for the layers above them in the protocol stack. In the CS domain a point-to-point CS signaling connection between the MM unit in the communication device and the MM unit in the CN may be provided. In the PS domain, a virtual point-to-point PS signaling connection between the GMM unit in the communication device and the GMM unit in the CN may be provided. These signaling connections are used by the MM/GMM unit to perform e.g. location updating towards the CN, and provide upper layer protocols with secure connection channels. Upper layers requesting such channels may comprise the CC (Call Control) protocol for control of voice calls, SM (Session Management) protocol for control of data sessions, and control of additional messaging services, such as SMS (Short Message Service), MMS (Multimedia Messaging Service). The upper layers are requesting the channels by transmitting a connection establishment to the MM/GMM unit, which will obtain the channel by triggering an establishment of a signal connection. The signal connection is set up by lower layers, such as the radio resource (RR) or radio resource control (RRC) layers.

When GMM initiates a procedure in WCDMA (Wideband Code Division Multiple Access) mode, a PS signaling connection is triggered by transmitting a connection establishment request followed by a message for requesting a certain MM/GMM procedure. If the GMM wishes to maintain the established connection after the MM/GMM procedure is finished, it may indicate a Follow-On Request (FOR) in a first message for requesting a certain MM/GMM procedure, which is transmitted to the CN. A maintained connection is e.g. desired if the GMM unit from the upper layers has received a connection establishment request, or if it has additional procedures to perform. Maintaining a connection instead of establishing a new connection decreases service response time, reduces power consumption, saves radio resources, and enhances quality of services to the upper layers. However, there is a problem in the prior art that the FOR has to be incorporated into the first message for establishing the connection. Thus, if the GMM unit receives an establishment request from an upper layer after the request for a certain MM/GMM procedure has been transmitted and before the established connection has been terminated, the connection might be terminated although a procedure is pending and awaiting service. If the connection could be maintained although the request for the MM/GMM procedure has been transmitted, service time and power consumption could be decreased. The same problem occurs in the CS domain if the MM unit receives a connection establishment request or a request for a certain MM procedure from the upper layer when a connection establishment request has been transmitted to the network MM unit.

WO-01/91382 discloses a system for provided routing area update message in a UMTS-based network. An attach and routing area update request is transmitted from a mobile station to a network node. Follow-on request is sent in the message if there is pending uplink traffic (signaling or user data). When the network node has processed the message, an acceptance message is transmitted to the mobile station, which may finish the procedure by returning a completion message.

WO 95/33353 discloses that in a telephone network after a transaction, such as a telephone call, has ended, the connection is not fully released. If a connection is to be set up upon ending of a current call, a flag is set in a connection management system. Depending on the status of the flag, different actions are taken in the network. The connection may be maintained for a predetermined interval.

SUMMARY OF THE INVENTION

It is an object of the invention to provide a method and apparatus for improving service response time of upper layers of a protocol stack, when an intermediate protocol obtains and controls connections between a communication apparatus and a network node.

According to a first aspect of the invention, a method in a communication apparatus achieves the object of the invention. A connection between the communication apparatus and a network node is established in response to issuing a request relating to a first procedure, such as a mobility management procedure, issued by a MM/GMM unit within the communication apparatus. According to the method, an acceptance message is received in response to the transmitting of the request. It is also determined whether a request relating to a second procedure, which may have been issued by an upper layer or an MM/GMM internal event, is pending. If any request is pending, a maintaining request, such as a FOR, for maintaining the established connection is transmitted to the network node.

The transmitting of the maintaining request may be executed if the pending request relating to the second procedure is received after the request relating to the first procedure is transmitted and before the acceptance message is received. Furthermore, the maintaining request may be transmitted separately or be incorporated into a response or acknowledgement message transmitted in response to the acceptance message. The established connection may be terminated when it is no longer in use.

The connection may be a circuit switched or a packet switched signaling connection. The method may be incorporated into a mobility management protocol, wherein e.g. a MM or GMM unit executes the method. The procedure initiating the request may be a location updating procedure requiring a signaling connection.

According to a second aspect of the invention, a second method achieves the object of the invention. The second method being implemented in a network node will maintain an established connection to a communication apparatus. A request relating to a specific procedure is received from the communication apparatus. In response to said request, an acceptance message is transmitted, which may comprise any data relating to the request. The connection is maintained a first predetermined period of time after the acceptance message is transmitted and a second period of time if a maintaining request is received within the first period of time.

The established connection may be maintained until the maintaining request for maintaining the connection is received, or until the time period has lapsed. The transmitted acceptance message may require an acknowledgement message in return, in which the maintaining message may be incorporated. However, if an establishment request is pending a response message comprising the maintaining message may be transmitted in response to the acceptance message although the acceptance message does not require so. Therefore, the network node maintains the connection the predetermined period of time such that the communication apparatus will have time to prepare and transmit the acknowledgement message.

According to a third aspect of the invention, a control device for maintaining an established connection to a communication node of a communication network achieves the object of the invention. The control device is adapted to receive an acceptance message and issue, if any request relating to a second procedure is pending, a maintaining request.

According to a fourth aspect of the invention, a communication apparatus comprising the control device achieves the object of the invention. The apparatus may be a mobile radio terminal, a mobile telephone, a pager, a communicator, a personal digital assistant, a smartphone, or an electronic organizer.

According to a fifth aspect of the invention, a control device of a network node for maintaining an established connection to a communication apparatus achieves the object of the invention. The control device is adapted to transmit an acceptance message in response to receiving a request relating to a specific procedure and to maintain said connection at least a first predetermined period of time and a second period of time if a maintaining request is received within the first period of time.

According to a sixth aspect of the invention, a network node comprising the network node control device for maintaining an established connection to a communication apparatus achieves the object of the invention. The network node may be a serving GPRS support node (SGSN), a gateway GPRS support node (GGSN), a mobile switching center/visitor location register (MSC/VLR), a home location register (HLR) or a gateway mobile switching center (GMSC).

According to a seventh aspect of the invention, a computer program product embodied on a computer readable medium comprising computer readable instructions for carrying out the method of the invention when run by an electronic device of the communication apparatus having digital computer capabilities achieves the object of the invention.

According to an eighth aspect of the invention, a computer program product embodied on a computer readable medium comprising computer readable instructions for carrying out the method of the invention when run by an electronic device of the network node having digital computer capabilities achieves the object of the invention It is an advantage of the invention that the quality of services to upper layers, e.g. data sessions and SMS, of a protocol stack with respect to a mobility management protocol, such as a MM or GMM protocol, may be enhanced. Furthermore, it is an advantage that retransmissions of signaling messages and service response time will decrease. Accordingly, the power consumption will be decreased.

Further embodiments of the invention are defined in the dependent claims.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

Further objects, features, and advantages of the invention will appear from the following description of several embodiments of the invention, wherein various aspects of the invention will be described in more detail with reference to the accompanying drawings, in which.

DETAILED DESCRIPTION OF EMBODIMENTS

Figure 1:
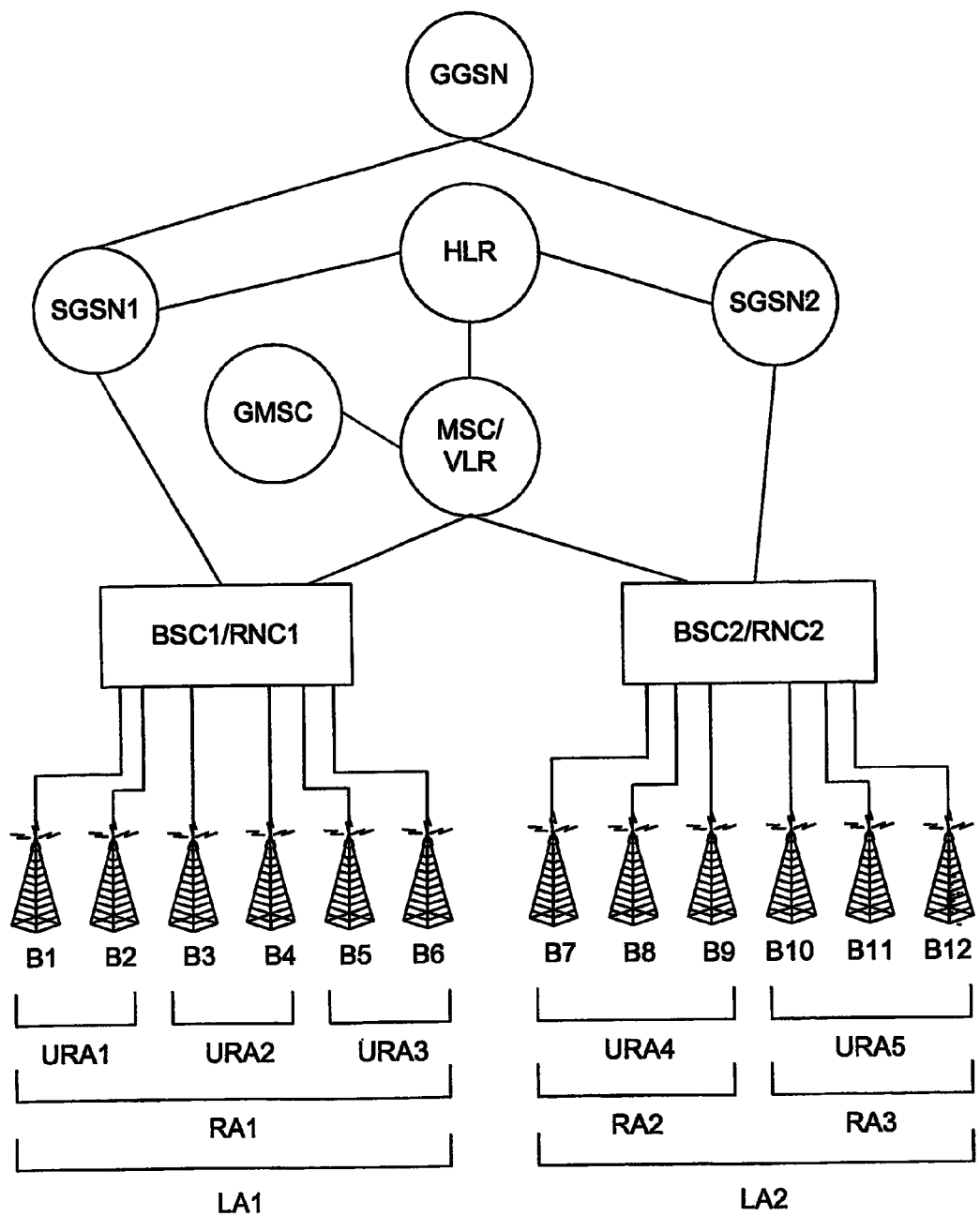
FIG. 1 is a schematic view of a mobile communication network.
Figure 2:
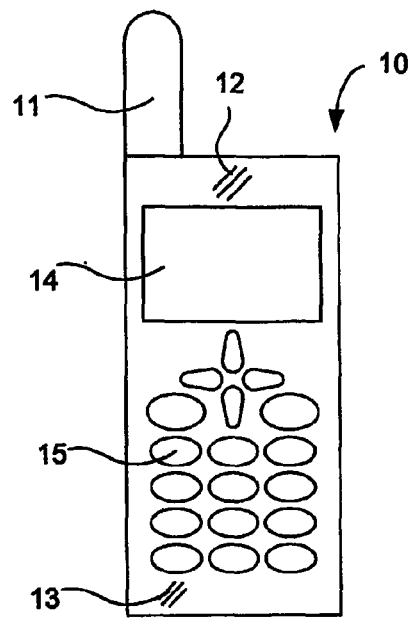
FIG. 2 is a front view of a mobile terminal.

FIGS. 1 and 2 illustrate a mobile telecommunication network and a mobile terminal 10, which may operate in said network. The mobile terminal 10 comprises an antenna 11 for transmitting signals to and for receiving signals from a base transceiver station (base stations) B1-B12 serving the area wherein the mobile terminal 10 is located. Each base station B1-B12 is part of a radio access network, such as a UTRAN and/or a BSS. Each base station B1-B12 is controlled by a controller, such as a radio network controller (RNC) RNC1-RNC2 of a UMTS system or a base station controller (BSC) BSC1-BSC2 of a GSM/GPRS system. Each BSC/RNC may control one or several base stations. The radio access network is connected to the core network (CN), which typically comprises network nodes for providing connections to landline communication networks when the mobile terminal 10 is involved in communicating speech or data. A mobile switching center/visitor location register (MSC/VLR) a gateway mobile switching center (GMSC) and a home location register (HLR) may provide a connection in the CS domain, and a serving GPRS support node (SGSN) SGSN1-SGSN2, a HLR, and a gateway GPRS support node (GGSN) in the PS domain. Each MSC/VLR and SGSN may serve one or several RNC/BSC, which may be different.

Each base station B1-B12 is part of a user registration area (URA) URA1-URA5, which comprises one or several base stations. Each URA URA1-URA5 is part of a registration area (RA) RA1-RA3, which comprises one or several URA. Furthermore, each RA is part of a location area (LA) LA1-LA2, which comprises one or several RA.

A user interface of the mobile terminal 10 comprises an earphone or loudspeaker 12, a microphone 13, a display 14, and a user input means, such as a keypad 15.

Figure 3:
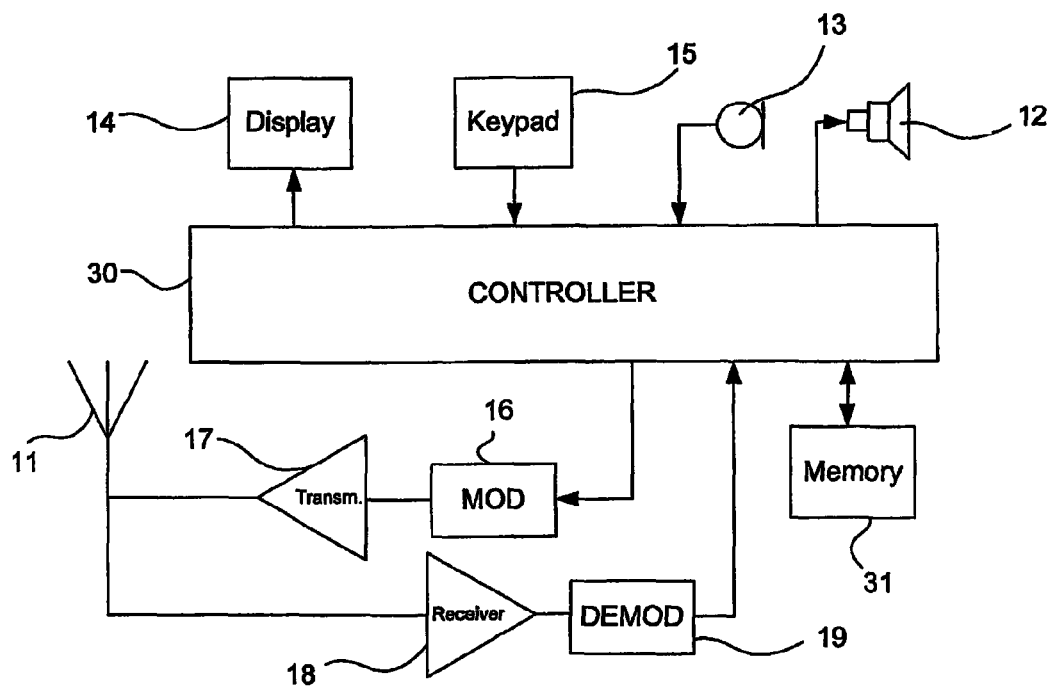
FIG. 3 is a block diagram of some components of the mobile terminal.

FIG. 3 illustrates some components, which the mobile terminal 10 may comprise. The mobile terminal 10 is adapted to wirelessly communicating speech and data, such as according to the UMTS or GSM/GPRS mobile telecommunication standards. The mobile terminal 10 comprises e.g. a modulator 16 connected to a transmitter 17 for transmitting signals via the antenna 11. Furthermore, the antenna 11 is connected to a receiver 18, which is connected to a demodulator 19 for receiving signals. The interface for communicating with the communication network may comprise several other components not shown here. The signals include signaling information in accordance with the air interface standard of the applicable wireless network or system in which the mobile terminal 10 operates.

The modulator 16 and the demodulator 19 are connected to a controller 30. The controller 30 comprises circuitry required for implementing the audio and logic functions of the mobile terminal 10. The controller 30 may be comprised of a digital signal processor, a microprocessor, various analog and digital converters, an ASIC (Application Specific Integrated Circuit) and other components. The control and signal processing functions of the mobile terminal 10 are allocated between these components and devices according to their respective capabilities. The controller 30 also comprises receiver means and issuing means or transmitting means, such as input and output terminals, on which messages according to the invention may be received from/transmitted to the receiver 18 and the transmitter 17, respectively. The controller 30 together with the output terminal may form the issuing means for issuing messages according to the invention.

The mobile terminal 10 further comprises various memories shown collectively as the memory 31. The memory may comprise a RAM (Random Access Memory), a ROM (Read Only Memory), and a SIM/USIM (Subscriber Identity Module/UMTS SIM) card. In the memory 31 a plurality of constants and variables may be stored that are used by the controller 30 during operation of the mobile terminal 10. The memory 31 may store permanent and temporal values of various system parameters and mobile terminal specific information, such as IMSI and P-TMSI.

The memory 31, in accordance with the aspects of this invention, also comprises several protocols for initiating and controlling communication using the communication interface. Computer readable instructions may be stored in the memory, which may carry out the method according to the invention when run by the controller 30 having digital computer capabilities. Furthermore, the controller 30 may comprise a register for storing data and/or instructions for carrying out the method of the invention.

Figure 4:
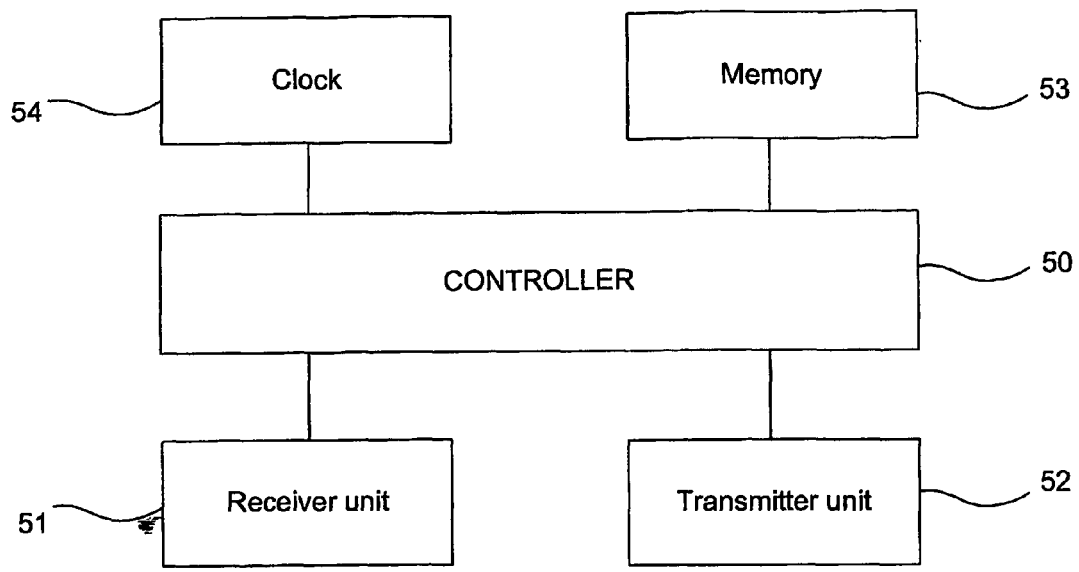
FIG. 4 is a block diagram of a network node.

FIG. 4 schematically illustrates the network node, which is adapted according to the present invention. The network node may be the SGSN node or the MSC/VLR node, or any other node in the network. The network node comprises a node controller 50, which is responsible for controlling and executing network communication and protocol based procedures, such as according to the MM/GMM protocol. The node controller 50 comprises circuitry required for implementing the logical functions of the network node. The node controller 50 may be comprised of one or several digital signal processors, microprocessors, various analog and digital converters, ASICs (Application Specific Integrated Circuit) and other components for communicating with the mobile terminal 10 by means of one or several access nodes of the communication system, such as the base stations B1-B12. The node controller 50 is connected to a receiver unit 51 and a transmitter unit 52 for receiving or transmitting e.g. data from/to the mobile terminal 10. Furthermore, the node controller 50 may obtain data required according to the mobility management aspects according to the invention, such as an identifier of a new LA or RA in which the mobile terminal has entered, or obtain a new P-TMSI.

The node controller 50 also comprises receiver means and issuing means or transmitting means, such as input and output terminals, on which messages according to the invention may be received from/transmitted to the receiver unit 51 and the transmitter unit 52, respectively. The node controller 50 together with the output terminal may form the issuing means for issuing messages according to the invention.

For reasons that will be explained below, the network node comprises a counter or a clock 54 for keeping track of when a specific message was sent to the mobile terminal 10. The counter or the clock 54 may be reset when the message is transmitted. Furthermore, when the counter or clock reaches a predetermined value, the node controller 50 will be notified.

The clock 54 together with the node controller 50 may form a waiting device, which is arranged to wait the predetermined period of time, during which the connection is maintained. If an acknowledgement message, such as the COMPLETE message in FIG. 5, is not received from the mobile terminal in response to the transmitted message when the notification is issued, the connection between the mobile terminal 10 and the network node may be terminated if no procedure is utilizing said connection.

The network node further comprises various memories shown collectively as the memory 53. The network node memory 53 may comprise a RAM (Read Only Memory), and a ROM (Read Only Memory). In the network node memory 53 are stored a plurality of constants and variables that are used by the node controller 50 during operation of the network node. The network node memory 53 may store permanent and temporal values of various system parameters and mobile terminal specific information, such as IMSI and P-TMSI relating to one or several mobile terminals.

The network node memory 53, in accordance with the aspects of this invention, may also comprise several protocols for initiating and controlling the communication. Computer readable instructions may be stored in the memory, which may carry out the method according to the invention when run by the node controller 50. The node controller 50 may also comprise a register for storing data and/or instructions for carrying out the method of the invention.

Figure 5:
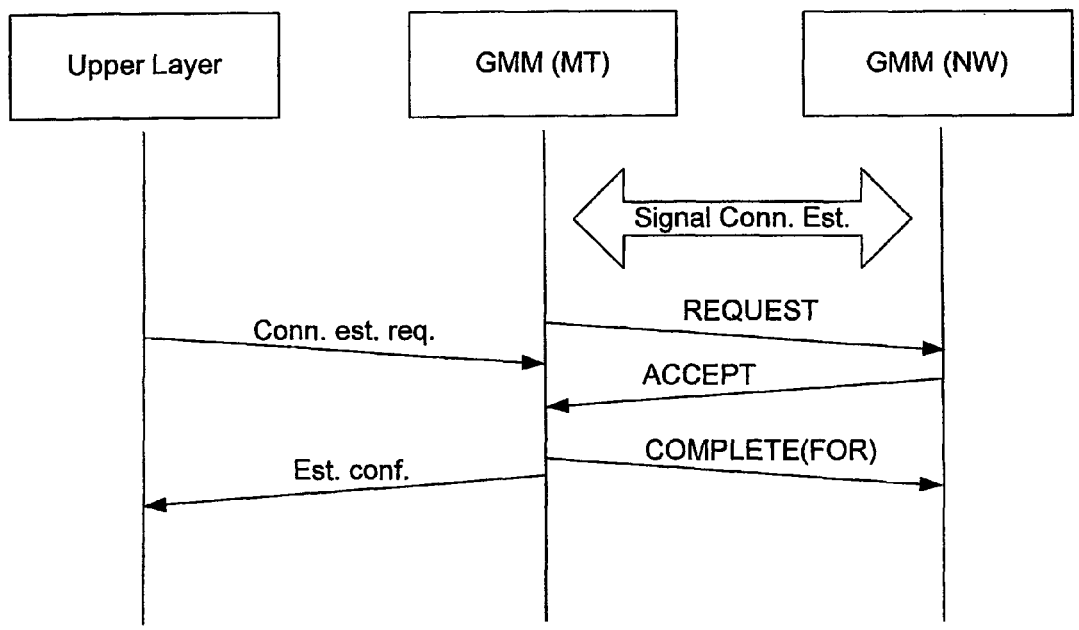
FIG. 5 is a signaling diagram of signals transmitted between the mobile terminal and the network node.

FIG. 5 is a signaling diagram illustrating the signaling scheme according to the invention. The mobile terminal 10 comprises a stack of protocols. The MM protocol is provided for supporting different procedures, e.g. location management, security management, mobile equipment management, and authentication procedures for executing security steps, such as network authentication, of a CS service. The GMM protocol supports PS services. GMM is a mobility management protocol for supporting procedures such as location management, authentication, temporary identity management, and equipment check.

The MM and GMM protocols serve upper layers and initiate, establish and manage signaling connections for the layers above them (upper layers) in the protocol stack. The MM and GMM protocols obtain signaling connections, over which the upper layers may transmit information. Requests for obtaining the connections are triggered by the GMM/MM unit. The request to establish or initiate a connection may be provided by a RRC (Radio Resource Control) message, which may carry a message, such as a layer 3 (L3) message, e.g. attach request, routing/location area update request, or a service request initiated by the MM/GMM unit. These requests may each trigger an establishment of a connection to the network node. After the signaling connection has been established, the MM/GMM unit of the mobile terminal 10 may transmit to the network node a request for a specific MM/GMM procedure over said connection. The request may e.g. be incorporated into a RRC message. In the following, such a request for a specific MM/GMM procedure is referred to as a REQUEST.

When the mobile terminal 10 e.g. enters from a first to a second location area in the CS domain, or from a first to a second routing area in the PS domain, the mobile terminal 10 must perform a location updating. Procedures for downloading e.g. parameters for the new LA/RA have to be provided when the mobile terminal 10 enters the new LA/RA. Such requests for mobility management are handled by the MM/GMM.

In the following, the signaling between the mobile terminal 10 and the network will be explained with regard to a GMM implementation. However, the signaling may equally be implemented with regard to a MM implementation. When a mobility service that needs a connection to the network, i.e. the SGSN or MSC/VLR, is required by the upper layers, a connection establishment request is transmitted to the GMM unit in the mobile terminal 10. In response thereto, the GMM will generate and transmit a REQUEST to lower layers, which will transmit the REQUEST to the GMM unit of the network when an signaling connection is established. The REQUEST may comprise a request for a certain service, such as a request according to the session management (SM) protocol to obtain a signaling channel to transmit data over.

The GMM unit may already have an ongoing procedure running when the connection establishment request is received from the upper layers. Such GMM procedures may comprise a routing area update request, a security check request, etc. Thus, the signaling connection, a PS signaling connection in this case, may be maintained and used by the upper layers. The REQUEST may comprise any other information relating to the specific request, such as mobile terminal access capability, routing area identifier, current P-TMSI, etc., which is implementation specific.

As is known in the art, if the GMM unit receives the connection establishment request relating to a second procedure from the upper layers before the REQUEST relating to a first procedure is transmitted, a Follow-On Request (FOR) may be attached to the REQUEST relating to the first procedure. Then, the established connection will be maintained when the procedure relating to the first procedure is finished, wherein the connection does not have to be established again. As should be noticed, the second procedure may relate to the same procedure as the first procedure. This is e.g. the case if a PS session is turned off at the same time as a RA update is ongoing, wherein the GMM should execute a detach procedure.

Alternatively, a FOR may be indicated if an event within the MM/GMM layer itself requires that a second procedure needs to be performed after a first procedure, such as an ongoing attach or RA update procedure, is completed.

In response to the REQUEST, the GMM unit of the network will generate an acceptance message, referred to as ACCEPT in the following, for indicating that the REQUEST is received and handled. The ACCEPT may comprise any information relating to the specific REQUEST, such as a new P-TMSI, routing area identifier etc.

Some GMM services require that the mobile terminal acknowledges that the data of the ACCEPT message is received. Thus a completion message, referred to as COMPLETE in the following, for acknowledging completion of the procedure is transmitted to the network GMM unit, e.g. as incorporated into a RRC message.

According to the invention, the upper layers (or the internal GMM event) may issue a connection establishment request relating to a second GMM procedure after the REQUEST message relating to the first GMM procedure has been transmitted to the network GMM unit. If the ACCEPT message issued in response to the REQUEST message relating to the first procedure has not been received before the connection establishment request relating to the second procedure is received from the upper layers, the FOR request may according to the invention be incorporated into the COMPLETE message finishing the procedure relating to first GMM procedure. A single bit in the COMPLETE message may implement the FOR request, wherein "1" indicates that FOR is valid, and "0" indicates that FOR is not valid. If FOR in the COMPLETE message is valid, the network GMM unit will maintain the connection, otherwise the connection is terminated when the procedure relating to the first GMM procedure is terminated.

As not all GMM procedures require a COMPLETE message the network GMM may not expect it. To be able to maintain the connection if a FOR will be issued in such a case, the network GMM unit may always wait for a COMPLETE message a predetermined period of time or until the message is received before the connection may be terminated. The time period may range from seconds to minutes, and may be tested in each particular case. If no COMPLETE message is received within the time period, the connection may be terminated whenever the connection is not utilized.

Alternatively, if the network GMM unit does not expect a COMPLETE message, it is arranged to not wait for any COMPLETE message. However, the mobile terminal may anyway issue the COMPLETE message, although the network will discard the message without any further processing.

When the mobile terminal 10 has transmitted the COMPLETE message, it will transmit a connection establishment confirmation to the appropriate requesting protocol of the upper layer. The confirmation indicates that a signaling connection is available.

Figure 6:
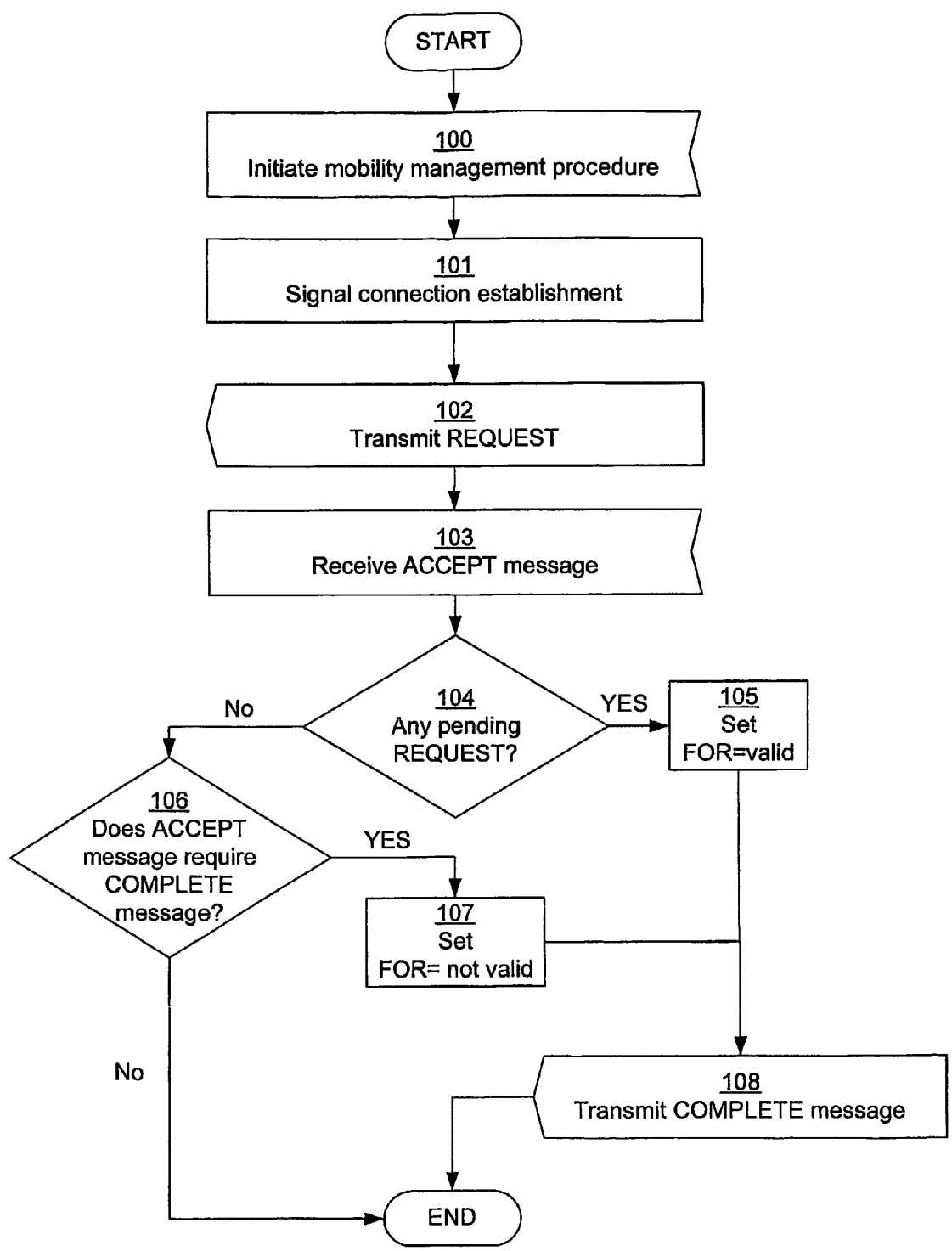
FIG. 6 is a flowchart of one embodiment of the method according to the invention carried out in the mobile terminal.

FIG. 6 illustrates the steps of one embodiment of the method according to the invention, which may be executed in the mobile terminal 10. In a first step 100, the GMM initiates a GMM procedure. In response thereto, the signal connection establishment procedure is initiated in step 101. In step 102, the REQUEST with regard to the GMM procedure is transmitted to the network GMM. Step 101 and 102 may be executed in a single step as described above. In step 103 the ACCEPT message is received from the network GMM. As the COMPLETE message has not yet been transmitted, in step 104 it is determined whether the GMM has a pending request for a connection establishment, i.e. if a connection establishment request relating to a second GMM procedure is received from the upper layers (or triggered by an internal GMM event) after the REQUEST was transmitted. If the answer in step 104 is yes, the FOR bit in the COMPLETE message is set to "valid" in step 105. However, if the answer in step 104 is no, it is determined in step 106 whether the procedure relating to the received ACCEPT message required a COMPLETE message. If the answer in step 106 is no, the procedure is ended. However, if the answer in step 106 is yes, the FOR bit in the complete message is set to "not valid" in step 107. The procedure continues from step 105 and 107 in step 108, wherein the COMPLETE message is transmitted to the network GMM. The signaling procedure may be ended when the connection is no longer in use.

A response or acknowledgement message may alternatively always be sent regardless of whether it was requested by the network node or not. Then, the FOR bit of the COMPLETE message may be set to "valid" or "not valid". If the network node was not expecting the response message, it does not have to pay any attention to the message, which may be discarded without any further processing.

Figure 7:
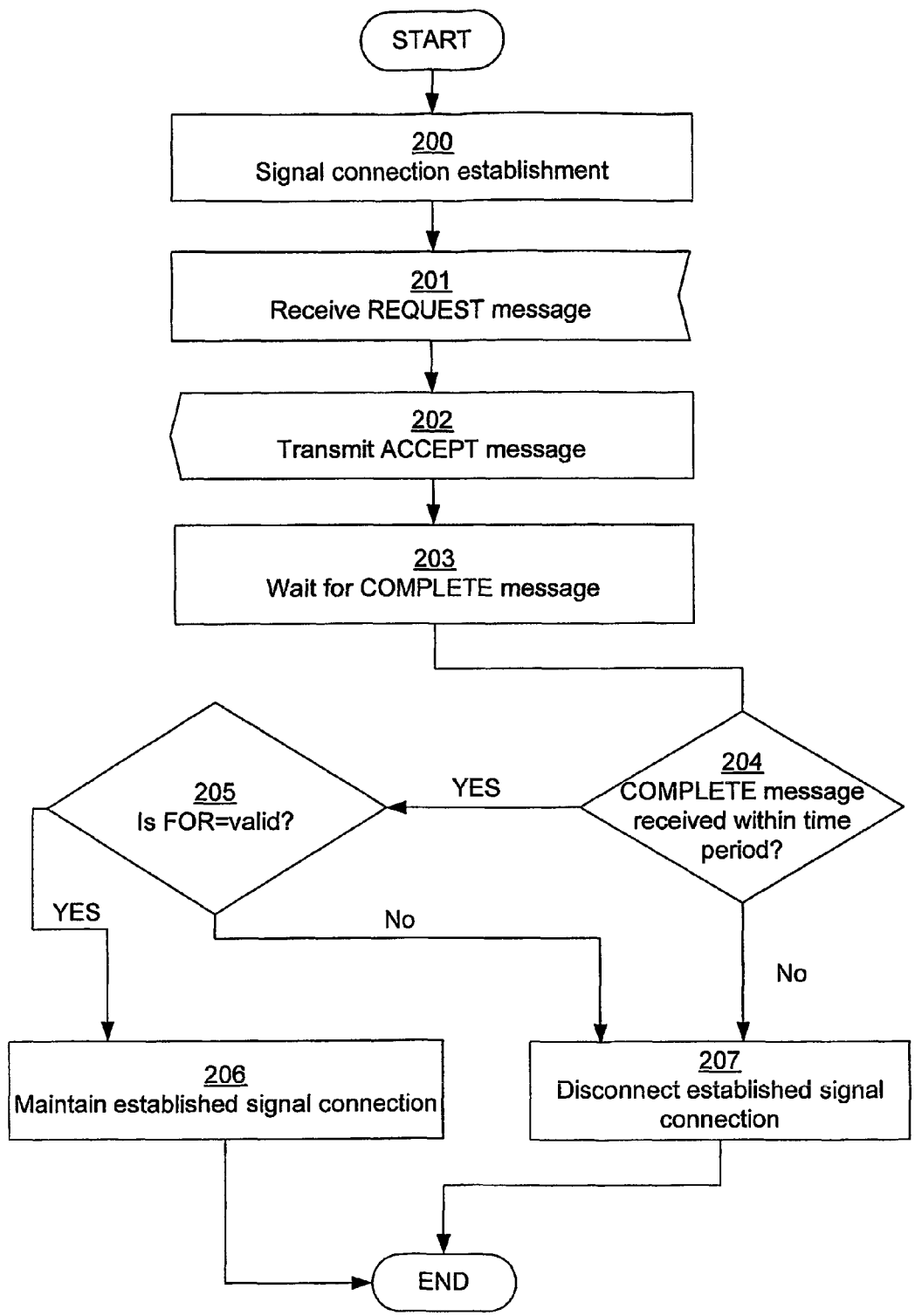
FIG. 7 is a flow chart of one embodiment of the method according to the invention carried out in the network node.

FIG. 7 illustrates one embodiment of the steps carried out in the network node according to the method of the invention. In a first step 200 the signaling connection is established, and the REQUEST relating to the GMM procedure is received in step 201. Step 200 and 201 may be executed in a single step if the REQUEST is received together with the request to establish the signal connection. Then the specific procedure relating to the REQUEST, such as a routing area update request, is identified. The network GMM performs any function required according to the procedure specified by the REQUEST, such as identifying a new RA and allocating a new P-TMSI. Any data that should be transmitted to the mobile terminal GMM is incorporated into the ACCEPT message, which is transmitted in step 202. The network GMM may then wait in step 203 a predetermined period of time for receiving a COMPLETE message in response to the transmitted ACCEPT message, during which the connection is maintained. Alternatively, if the COMPLETE message is required according to the ACCEPT message, the GMM waits until the COMPLETE message actually is received. In step 204 it is determined whether the COMPLETE message was received within the predetermined period of time. If the answer in step 204 is yes, the procedure continues in step 205, wherein it is determined whether FOR of the COMPLETE message is "valid". If the answer in step 205 is yes, the procedure continues in step 206, wherein the established connection is maintained. When the connection maintained in step 206 is no longer in use, the connection may be terminated, wherein the procedure is ended. However, if the answer in step 204 or 205 is no, the procedure continues in step 207, wherein the connection is disconnected when the signaling connection is no longer in use by the GMM procedure.

If the network GMM unit does not expect any COMPLETE message, the procedure in FIG. 7 may proceed directly from step 202 to step 207.

If the above methods are used in the CS domain, the FOR request may have to be acknowledged by the network node by transmitting a Follow-On Proceed (FOP). If the FOR request is incorporated into the REQUEST message, the FOP may be incorporated into the ACCEPT message. However, if the FOR request is incorporated in the COMPLETE message, the FOP acknowledgement may be transmitted separately, or incorporated into another message transmitted between the network MM and the mobile terminal MM.

The present invention has been described above with reference to specific embodiments. However, other embodiments than the above described are equally possible within the scope of the invention. Different method steps than those described above, performing the method by hardware or software, may be provided within the scope of the invention. The different features and steps of the invention may be combined in other combinations than those described. The scope of the invention is only limited by the appended patent claims.

The invention claimed is:

1. A method in a communication apparatus for maintaining an established connection between said communication apparatus and a network node of a serving communication network, comprising the steps of:
    receiving an acceptance message from said network node in response to a request message relating to a first procedure transmitted to said network node;
    determining whether any request relating to a second procedure is pending; and,
    transmitting to said network node, if any such pending request for a second procedure is received after the request relating to the first procedure was transmitted and before said acceptance message is received, a response message containing a maintaining request for maintaining said connection.

2. The method according to claim 1, wherein the response message is an acknowledgement message.

3. The method according to claim 1, further comprising the step of maintaining said established connection until the connection is no longer in use.

4. The method according to claim 1, wherein the established connection is a packet switched or a circuit switched signaling connection.

5. The method according to claim 1, wherein the method is comprised in a mobility management protocol of a wireless communication interface of the electronic communication apparatus, and wherein a mobility management unit handles the signaling to the network node.

6. The method according to claim 1, wherein the first and second procedures are mobility management procedures.

7. The method according to claim 1, wherein the maintaining request is a Follow-On Request (FOR).

8. A control device for a communication apparatus for maintaining an established connection to a communication network, the control device being adapted to issue a request to maintain said connection, comprising:

receiver means arranged to receive an acceptance message in response to transmitting a request relating to a first procedure; and, transmitter means for transmitting to said network node, if any such pending request for a second procedure is received after the request relating to the first procedure was transmitted and before said acceptance message is received, a response message containing a maintaining request for maintaining said connection.

9. The control device according to claim 8, wherein the response message is an acknowledgement message.

10. The control device according to claim 8, comprising a memory for storing a mobility management protocol of a wireless communication interface, according to which the requests are transmitted, and the acceptance message is received.

* * * * *

UNITED STATES PATENT AND TRADEMARK OFFICE
CERTIFICATE OF CORRECTION

| | | |
|---|---|---|
| PATENT NO. | : 8,069,249 B2 | Page 1 of 1 |
| APPLICATION NO. | : 10/595165 | |
| DATED | : November 29, 2011 | |
| INVENTOR(S) | : Davidsson | |

It is certified that error appears in the above-identified patent and that said Letters Patent is hereby corrected as shown below:

On the Title Page, in the Figure, in Box "107", in Line 2, delete "FOR= not valld" and insert -- FOR=not valid --, therefor.

On the Title Page, in Field (56), under "OTHER PUBLICATIONS", in Column 2, Line 2, delete "PCT?EP" and insert -- PCT/EP --, therefor.

In Fig. 6, Sheet 4 of 5, in Box "107", in Line 2, delete "FOR= not valid" and insert -- FOR=not valid --, therefor.

In Column 1, Line 53, delete "Network." and insert -- network. --, therefor.

In Column 2, Line 64, delete "WO-01/91382" and insert -- WO 01/91382 --, therefor.

Signed and Sealed this
Second Day of October, 2012

David J. Kappos
*Director of the United States Patent and Trademark Office*